Oct. 5, 1965  R. T. CORNELIUS  3,209,952
APPARATUS FOR PRODUCING AND DISPENSING CARBONATED BEVERAGES
Filed Nov. 15, 1962
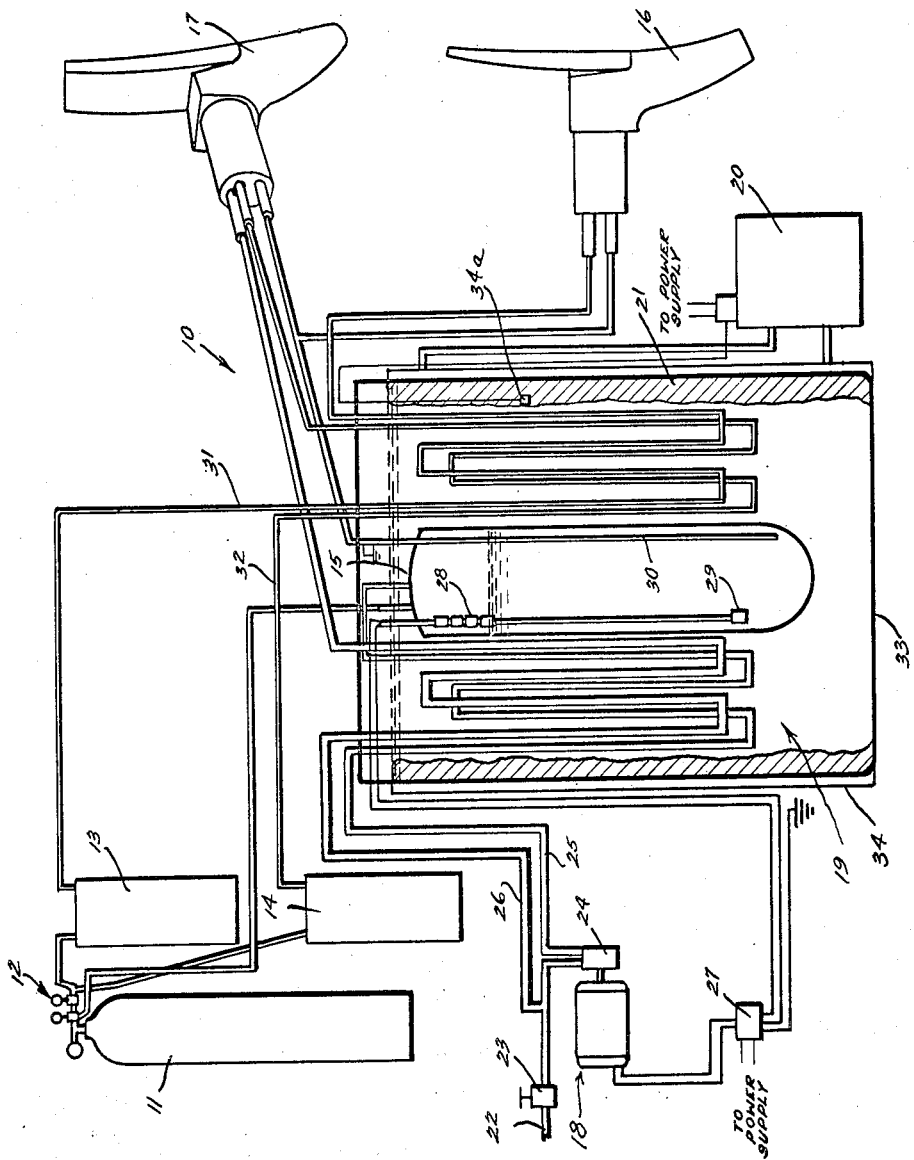
INVENTOR.
RICHARD T. CORNELIUS
BY
ATTORNEYS

3,209,952
APPARATUS FOR PRODUCING AND DISPENSING CARBONATED BEVERAGES
Richard T. Cornelius, Minneapolis, Minn., assignor to The Cornelius Company, Anoka, Minn., a corporation of Minnesota
Filed Nov. 15, 1962, Ser. No. 237,872
3 Claims. (Cl. 222—129.1)

This invention relates generally to apparatus for producing and dispensing carbonated beverages, and more specifically to an improved means for doing so in a retail establishment having a soda fountain or bar.

It is known that there is a tendency for stored carbonated water to lose carbonation to the atmosphere above it, or to absorb carbon dioxide gas from the atmosphere above it until a condition of stability is obtained. In some instances, the elapse of time and ensuing absorption of carbon dioxide is relied upon for carbonating the water. In other instances, such absorption or yielding of carbon dioxide causes the carbonated water to become overcarbonated or to go at least partially "flat." It is also known that certain carbonated beverages are most palatable when they are provided with a relatively high level of carbonation, and that other carbonated beverages are most palatable when provided with a relatively light or mild level of carbonation. It has therefore been customary to provide separate and distinct carbonation systems for the different types of beverage. It has also been known to cool carbonated water, and to mix it with other beverage ingredients which typically have a higher temperature. An attempt has been made to remedy this problem by including cracked ice in the beverage container, the quantity of which is not closely regulated, and the melting of which is relied upon for lowering the temperature of the mixed beverage to a satisfactory level. It has also been known that there is a tendency for a bacterial growth to exist in syrup storage means. A further known problem is that light intermittent usage of a system causes a beverage to be dispensed or provided which may be near optimum temperature, but wherein such temperature increases materially if the usage or dispensing becomes relatively continual or heavy.

Accordingly, it is an object of this invention to provide an improved apparatus for dispensing a carbonated beverage.

A further object of the present invention is to provide an improved apparatus for producing or mixing a carbonated beverage.

A still further object of the present invention is to provide an improved apparatus for both producing or mixing and dispensing a carbonated beverage.

A still further object of the present invention is to provide a means whereby the various liquid ingredients to be employed in the mixing of a carbonated beverage are stored at what is substantially a single temperature, which temperature is suitable for the finished or mixed beverage.

A still further object of the present invention is to provide a means of storing carbonated water stably wherein carbon dioxide gas is neither absorbed nor released.

Yet another object of the present invention is to provide a means of producing carbonated beverages having different levels of carbonation while employing a single source of carbonated water.

A still further object of the present invention is to provide a means for maintaining liquid beverage ingredients at a temperature close to the freezing point without there being any likelihood that any ingredient might freeze.

Yet another object of the present invention is to provide a means for precluding bacterial growth in the syrup storage means of a carbonated beverage producing system.

A still further object of the present invention is to provide a means for dispensing carbonated beverages wherein the discharged beverage will have the same temperature both for heavy or continual and light or intermittent usage.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

The drawing is a schematic representation of a carbonated beverage producing and dispensing system constructed in accordance with the principles of the present invention.

As shown on the drawings:

The principles of this invention are particularly useful when embodied in a carbonated beverage mixing and dispensing system such as illustrated in the drawing, generally indicated by the numeral 10. The system 10 includes a pressurized source or tank of carbon dioxide gas 11 to which is connected carbon dioxide gas pressure regulator means 12 which supplies pressurized carbon dioxide gas to a syrup supply source or tank 13 and also to a second syrup supply source or tank 14 and to a carbonator 15. Connected to the carbonator 15 is a mixing and dispensing valve 16 and a second mixing and dispensing valve 17. A pressurized source of water generally indicated at 18 is connected to the carbonator 15 which is disposed within a refrigerated bath of liquid generally indicated at 19 which is under the thermal control of a refrigeration system 20 which is operative to provide a layer of ice 21 in the bath water remote from the carbonator 15 and from the other lines in the liquid bath 19.

Carbon dioxide gas from the tank or source 11 is delivered by the regulator means 12 at pressures appropriate for the purposes used. To this end, the regulator means 12 should be set to provide a driving pressure applied to each of the syrup tanks 13 and 14, a pressure of 40 p.s.i. being typical for such purpose. Carbon dioxide gas is thus also provided to the carbonator 15 at an appropriate pressure such as 28 p.s.i., which pressure is the serving pressure at the valves 16 and 17.

The pressurized source of water 18 is connected as at 22 to a water supply which typically has a pressure in the range of 20 to 75 p.s.i. The line 22 leads to a water pressure regulator 23 which typically is set to discharge or provide fresh water at a pressure of about 20 p.s.i. The water pressure regulator 23 is connected to the inlet of a motor driven pump 24 which raises the pressure, the pump typically having a discharge pressure in the range of 90 to 100 p.s.i. which is delivered to a water line 25, a serpentine portion of which is disposed in the liquid bath 19 and which is connected to discharge fresh water into the carbonator 15. The water pressure regulator 23 also provides water to a line 26 also having a serpentine portion disposed in the liquid bath 19 and which is connected at its other end to the valve 17. The motor driven pump 24 is under the operative control of an electric level control 27 which is connected to a high water level contact 28, a low level contact 29, and a common contact 30 disposed within the carbonator 15.

Further structural details of the carbonator 15, and of the valves 16 and 17 are shown in my copending applications for U.S. patent, Ser. No. 237,942 and Ser. No. 237,931, respectively, filed on even date herewith.

The syrup tank 13 is connected by a line 31, a portion of which is disposed in the liquid bath 19, to the mixing and dispensing valve 16. Similarly, the syrup tank 14 is connected by a line 32 to the dispensing and mixing valve 17, the line 32 also having a serpentine portion thereof disposed in the liquid bath 19.

The liquid bath 19 comprises a tank 33 which is surrounded by a refrigeration evaporator 34 which forms a part of the refrigeration system 20. The refrigeration system 20 includes a temperature responsive switch 34a disposed within the liquid bath which is operative to effect shutdown of the refrigeration system when the ice bank 21 builds up adjacent to the thermostatic switch 34a to the extent that the temperature thereof is lowered below a predetermined point which signals the existence of a maximum predetermined thickness of ice 21 on the interior of the tank 33.

The various lines leading to the valves 16 and 17 are suitably sized or provided with appropriate restrictions so that the proper proportions of the various liquid ingredients are simultaneously dispensed. The mixing and dispensing valve 16 has separate valve elements for each line which are simultaneously opened and which thus simultaneously discharge liquid therethrough. Similarly, the mixing and dispensing valve 17 also has a separate valve element for each of the lines connected thereto, which valve elements are simultaneously opened and closed for simultaneously drawing a liquid ingredient from each of the lines and for mixing the same for joint dispensing thereof.

The system described incorporates a novel method for producing and/or mixing carbonated beverages. This invention can be practiced with other structural components than those disclosed. To this end I wish to emphasize that the carbonator 15 provides a highly carbonated supply of carbonated water, which supply of carbonated water is periodically replenished in response to the level of the water within the carbonator falling below the electrode 29, the replenishing terminating when the water level therein reaches the electrode 28. Thus, beverage may be withdrawn from either of the valves 16 or 17 for a goodly number of servings at intermittent intervals before the motor driven pump 24 replenishes the supply. In the drawing, there is shown only one syrup supply tank 13 and one dispensing valve 16. This portion of the system is adapted to provide highly carbonated mixed beverages such as those of the cola type, the lemon-lime type, and the ginger ale type. By closing off the pressure on the syrup tank 13, highly carbonated charged water is provided. It is thus within the scope of this invention that the tank 13 and the valve 16 including interconnecting piping or lines be duplicated to the extent necessary to provide the number of beverage sources of the highly carbonated type which may be desired.

The syrup tank 14 is provided to supply syrup to the mixing valve 17, such syrup typically comprising orange or grape-flavored syrup. Beverages of this type require a somewhat lower or milder level of carbonation and to this end the water line 26 provides non-carbonated water, refrigerated in the liquid bath 19, to the dispensing valve 17 whereby the carbonation level of the resulting beverage is reduced with refrigerated uncarbonated water. Each time that a beverage is mixed by the valve 17, the portion of uncarbonated water which is withdrawn from the line 26 is replenished with additional fresh water. Similarly, each time that flavored syrup is withdrawn from the lines 31 and 32 by the valves 16 and 17, the withdrawn portion is replenished by an added quantity of syrup from the tank 13 or 14 respectively.

The tank 14 and the valve 17 will be duplicated in an actual system to provide the number of sources of mildly carbonated beverage which are desired at a particular installation.

The disclosed preferred system thus provides refrigeration for all of the liquid ingredients including carbonated water, non-carbonated water, and flavored syrup which are employed to make the various beverages desired. These are all maintained at one temperature which constitutes the serving temperature and the same need not be diluted by supplemental ice at serving.

Since the carbonated water in the carbonator 15 is stored at the temperature at which it was carbonated, and since carbon dioxide gas carbonating pressure remains applied thereto, the stored carbonated water is stable and does not absorb or release carbon dioxide gas to any significant extent during prolonged storage between intermittent uses of the system.

I have also found that the continual application of pure carbon dioxide gas to the syrup stored in the tanks 13 and 14 precludes or inhibits bacterial growth therein, thereby aiding in maintaining the syrup tanks 13 and 14 internally clean.

The liquid used in the liquid bath 19 comprises water and thus the ice 21 is formed as described above. During intermittent use of the dispensing system, the refrigeration system portion thereof will cycle on occasion to remove the heat that has been added to the water bath 19. When the dispensing system is temporarily put into heavy or nearly continual usage, a great amount of heat is deposited into the water bath, the temperature of which is maintained substantially at the freezing point of water or slightly above until the entire ice bank or layer 21 has been used up. The refrigeration capacity is such that this is not likely to occur even during abnormally heavy usage. Further, the ice bank 21 assists in maintaining the carbonating temperature and the carbonated water storage temperature until such ice bank is used up.

When the valve 17 is open, there is simultaneously withdrawn and mixed a selected ratio of the carbonated water, the non-carbonated water, and the syrup. Similarly, when the mixing and dispensing valve 16 is opened, there is simultaneously mixed and withdrawn a selected ratio of the carbonated water and the other syrup to produce a somewhat more highly carbonated beverage. Even though the system may be used only intermittently for any particular beverage or for all beverages, the level of carbonation is substantially constant for each of the two types of beverage, thus providing a high-quality beverage.

In an actual installation, the various liquid lines preferably comprise stainless steel, especially in the liquid bath 19, which lines may be readily disconnected for periodic cleaning and inspection.

If desired, the motor driven pump 24 may be protected by the provision of a low pressure water control in the line 22 to insure that it will not be operated under conditions likely to damage the same.

I wish to emphasize the advantageous nature of the use of the replenished ice in the liquid bath, since it has a heat absorption ability 143 times as great as the water itself.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A system for producing and dispensing two differently carbonated beverages, comprising in combination:
    (a) a first and a second coiled fresh-water line each adapted to be directly connected to a pressurized source of fresh water;
    (b) a carbonator adapted to be connected to a pressurized source of carbon dioxide gas, and connected to said first coiled fresh-water line;
    (c) a pair of dispensing valves each connected to said carbonator and each adapted to discharge a beverage, one of said valves being an internal mixing valve also connected to said second coiled fresh-water line and operable to internally mix and to dispense a mixture of fresh water and carbonated water as a part of said beverage; and (d) a refrigerated bath of liquid in which the coils of both of said fresh-water lines are disposed.

2. A system for producing and dispensing a carbonated beverage, comprising in combination:
   (a) a coiled fresh-water line adapted to be directly connected to a pressurized source of fresh water;
   (b) a carbonator adapted to be connected to a pressurized source of carbon dioxide gas, and connected to said coiled fresh-water line;
   (c) a dispensing valve connected to said carbonator and adapted to discharge the beverage;
   (d) a tank operative to hold a bath of water in which the coil of said fresh-water line is disposed; and
   (e) refrigeration means operative on the outer side of a wall of said tank to freeze the bath water to a predetermined thickness of ice disposed on the inner side of said wall, and remotely from said fresh-water line disposed in said bath.

3. A system for producing and dispensing two differently carbonated beverages, comprising in combination:
   (a) a first and a second coiled fresh-water line each adapted to be directly connected to a pressurized source of fresh water;
   (b) a carbonator adapted to be connected to a pressurized source of carbon dioxide gas, and connected to said first coiled fresh-water line;
   (c) a pair of dispensing valves each connected to discharge a beverage, one of said valves being an internal mixing valve also connected to a supply of flavored syrup and to said second coiled fresh-water line and operable to internally mix and to dispense a mixture of the syrup and fresh water and carbonated water as a part of said beverage;
   (d) a tank operative to hold a bath of water in which the coils of both of said fresh-water lines are disposed; and
   (e) refrigeration means operative on the outer side of a wall of said tank to freeze the bath water to a predetermined thickness of ice disposed on the inner side of said wall, and remotely from said fresh-water lines disposed in said bath.

References Cited by the Examiner

UNITED STATES PATENTS

| | | | |
|---|---|---|---|
| 1,029,838 | 6/12 | Wittemann | 99—79 |
| 1,243,068 | 10/17 | Humphrey | 99—79 |
| 2,462,019 | 2/49 | Bowman | 222—129.4 X |
| 2,498,524 | 2/50 | Booth | 222—129.1 X |
| 2,536,400 | 1/51 | Thompson | 222—129.4 X |
| 2,548,241 | 4/51 | Reynolds et al. | |
| 2,657,628 | 11/53 | Von Stoeser | 222—129.4 X |
| 2,674,263 | 4/54 | Rupp et al. | 222—129.1 X |
| 2,750,076 | 6/56 | Welty et al. | 222—146 X |
| 2,755,979 | 7/56 | Lawson et al. | 222—129.4 X |
| 2,776,074 | 1/57 | Laurence | 222—129.4 X |
| 2,828,889 | 4/58 | Joschko | 222—129.4 X |
| 2,932,432 | 4/60 | Beard | 222—394 |
| 2,932,433 | 4/60 | Abplanalp | 222—394 |
| 2,978,143 | 4/61 | Arnett et al. | 222—129.1 X |

RAPHAEL M. LUPO, *Primary Examiner.*

A. LOUIS MONACELL, *Examiner.*